US008868976B2

(12) United States Patent
Ben-Yehuda et al.

(10) Patent No.: US 8,868,976 B2
(45) Date of Patent: Oct. 21, 2014

(54) SYSTEM-LEVEL TESTCASE GENERATION

(75) Inventors: Shimon Ben-Yehuda, Kibutz Ha'Solellim (IL); Shady Copty, Nazareth (IL); Alex Goryachev, Haifa (IL); John David Jabusch, Cary, NC (US); Ronny Morad, Kiriat Ata (IL)

(73) Assignee: International Business Machines Corporation, Armonk, NY (US)

( * ) Notice: Subject to any disclaimer, the term of this patent is extended or adjusted under 35 U.S.C. 154(b) by 676 days.

(21) Appl. No.: 12/939,189

(22) Filed: Nov. 4, 2010

(65) Prior Publication Data

US 2012/0117424 A1 May 10, 2012

(51) Int. Cl.
*G06F 11/00* (2006.01)
*G06F 11/263* (2006.01)
*G06F 11/36* (2006.01)

(52) U.S. Cl.
CPC .......... *G06F 11/263* (2013.01); *G06F 11/3684* (2013.01)
USPC .............................................. 714/32; 714/25

(58) Field of Classification Search
CPC .................... G06F 11/3688; G06F 11/3684
USPC .......................................... 714/32, 25, 30, 31
See application file for complete search history.

(56) References Cited

U.S. PATENT DOCUMENTS

| | | | |
|---|---|---|---|
| 4,503,386 A | 3/1985 | DasGupta et al. | |
| 4,550,406 A | 10/1985 | Neal | |
| 5,202,889 A | 4/1993 | Aharon et al. | |
| 5,646,949 A | 7/1997 | Bruce et al. | |
| 5,774,358 A | 6/1998 | Shrote | |
| 6,006,028 A | 12/1999 | Aharon et al. | |
| 6,199,031 B1 * | 3/2001 | Challier et al. | 703/14 |
| 6,571,373 B1 | 5/2003 | Devins et al. | |
| 6,606,721 B1 | 8/2003 | Gowin et al. | |
| 6,615,167 B1 | 9/2003 | Herzl et al. | |
| 7,020,570 B2 | 3/2006 | Liu | |
| 7,079,490 B1 * | 7/2006 | Hady et al. | 370/241 |
| 7,213,219 B2 | 5/2007 | Iima | |
| 7,257,802 B2 | 8/2007 | Daw et al. | |
| 7,260,495 B2 | 8/2007 | Gupta et al. | |
| 7,472,034 B2 | 12/2008 | Gupta et al. | |

(Continued)

OTHER PUBLICATIONS

Ronny Morad et al., "Hybrid System-Level Test Generation Approach for Heterogeneous Systems", DAC user track 2010.

(Continued)

*Primary Examiner* — Sarai Butler
(74) *Attorney, Agent, or Firm* — Ziv Glazberg

(57) ABSTRACT

A system-level testcase may be generated by performing system-level generation tasks by a system-level generator to produce an abstract testcase. Based upon the abstract testcase, one or more unit-level generators may generate the testcase. The testcase may be utilized in simulation of operation of a system-under-test (SUT). The testcase may be utilized for verification of the SUT. The SUT may comprise a plurality of units. The unit-level generator may be associated with units of the SUT and perform generation tasks associated with pertinent units.

25 Claims, 3 Drawing Sheets

(56) References Cited

U.S. PATENT DOCUMENTS

| | | | |
|---|---|---|---|
| 2003/0018945 A1* | 1/2003 | Foster et al. | 716/5 |
| 2004/0153830 A1* | 8/2004 | Cebula et al. | 714/38 |
| 2006/0212756 A1* | 9/2006 | Emek et al. | 714/30 |
| 2006/0224924 A1* | 10/2006 | Grieskamp et al. | 714/38 |
| 2007/0055911 A1* | 3/2007 | Boehm et al. | 714/31 |
| 2007/0271483 A1* | 11/2007 | Kolawa et al. | 714/38 |
| 2008/0209276 A1* | 8/2008 | Stubbs et al. | 714/38 |
| 2008/0263486 A1* | 10/2008 | Alexanian et al. | 716/5 |

OTHER PUBLICATIONS

Roy Emek et al., "X-Gen: A Random Test-Case Generator for Systems and SoCs", HLDVT 2002.

Geist Daniel and Vaida Oded, "A Method for Hunting Bugs that Occur Due to System Conflicts", HLDVT 2008.

* cited by examiner

SYSTEM-LEVEL TESTCASE GENERATION

BACKGROUND

The present disclosure relates to testing in general, and to generation of a system-level testcase, in particular.

Computerized devices control almost every aspect of our life—from writing documents to controlling traffic lights. However, computerized devices are bug-prone, and thus require a testing phase in which the bugs should be discovered. The testing phase is considered one of the most difficult tasks in designing a computerized device. The cost of not discovering a bug may be enormous, as the consequences of the bug may be disastrous. For example, a bug may cause the injury of a person relying on the designated behavior of the computerized device. Additionally, a bug in hardware or firmware may be expensive to fix, as patching it requires call-back of the computerized device. Hence, many developers of computerized devices invest a substantial portion, such as 70%, of the development cycle to discover erroneous behaviors of the computerized device.

During the testing phase, functional verification may be performed. One approach to functional verification is to perform simulation of a system-under-test (SUT). The simulation operates based on stimuli that may be generated. In some exemplary embodiments, a testcase generator is operative to generate a testcase to provide for stimuli of the SUT. The testcase may be generated based upon a test template. In some exemplary embodiments, the testcase may be a list of instructions to the SUT which are in turn simulated by the simulator. The test template may be a descriptive specification of a set of testcases. The test template may be provided using, for example, a context-free formal language. The test template may comprise commands as to how the generation of the testcase is to be performed. These commands generally define generation tasks, such as for example setting an address to be used in the instruction, selecting an instruction out of a set of instructions, determining a number of repetitions to be performed, determining whether a synchronization event occurs, or the like. Generally speaking, based on the test template a plurality of alternative testcases may be generated, all are characterized in fulfilling the requirements of the test template. In some cases, the test template may explicitly or implicitly define generation tasks. For example, in some cases, the test template may describe a template of a resulting testcase, and therefore implicitly define generation tasks.

An offline generator is designed to generate a testcase, which is in turn utilized by the simulator for simulation. An online generator is designed to operate in generation-simulation cycles. In each cycle one or more instructions of the testcase may be generated, and in turn simulated by the simulator. Based on the simulated execution of the previous cycle, generation of consecutive instruction(s) may be performed.

In some exemplary embodiments, a generator may be a general-purpose generator, such that may employ a Constraint Satisfaction Problem (CSP) solver to generate the testcase based on the test template. The CSP solver may, for example, be utilized to determine an instruction that is in line with the requirements of the test template and that is optionally biased towards a quality testcase. In some exemplary embodiments, biasing may be architecture-aware, such as to invoke specific events of the specific architecture of the SUT (e.g., cache events, page faults, segmentation faults, resource contentions, address collisions or the like). In some exemplary embodiments, the test template is translated into a series of CSPs comprising of hard constraints and soft constraint, wherein the soft constraints are utilized to bias the testcase towards a higher quality testcase, when possible.

In some exemplary embodiments, the generator may be a special-purpose generator, such as specifically designed for the purpose of generating testcases for the SUT. A dedicated generator may be utilized when a CSP-based approach is not efficient. For example, a CSP approach of a cryptographic engine which encodes and decodes inputs may require the CSP solver to solve a relatively hard computational problem of computing the encryption function. Use of a dedicated solver may provide for a more efficient solution.

SUMMARY

One exemplary embodiment of the disclosed subject matter is a computerized apparatus for generating a testcase, the computerized apparatus having a processor and a storage device, the computerized apparatus comprising: a test template obtainer operative to obtain a test template associated with a system-under-test (SUT), wherein the SUT comprises a plurality of units, wherein the test template represents alternative testcases in which the plurality of units interact, a system-level generator operative to generate an abstract testcase based on the test template, wherein the system-level generator is operative to perform system-level generation tasks defined by the test template; and at least one unit-level generator operative to generate a testcase comprising the abstract testcase, wherein the at least one unit-level generator is operative to perform unit-level generation tasks defined by the test template.

Another exemplary embodiment of the disclosed subject matter is a computer-implemented method for generating a testcase, wherein the computer-implemented method is performed by a processor, the computer-implemented method comprising: obtaining a test template associated with a system-under-test (SUT), wherein the SUT comprises a plurality of units, wherein the test template defines system-level generation tasks and unit-level generation tasks; generating an abstract testcase based on the test template, wherein the generating the abstract testcase comprises performing the system-level generation tasks; generating the testcase, wherein the testcase comprises the abstract testcase, wherein the generating the testcase comprises performing the unit-level generation tasks; and outputting the testcase.

Yet another exemplary embodiment of the disclosed subject matter is a computer program product for generating a testcase, the product comprising: a non-transitory computer readable medium; a first program instruction for obtaining a test template associated with a system-under-test (SUT), wherein the SUT comprises a plurality of units, wherein the test template defines system-level generation tasks and unit-level generation tasks; a second program instruction for generating an abstract testcase based on the test template, wherein the generating the abstract testcase comprises performing the system-level generation tasks; a third program instruction for generating the testcase, wherein the testcase comprises the abstract testcase, wherein the generating the testcase comprises performing the unit-level generation tasks; and wherein the first, second and third program instructions are stored on the computer readable medium.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
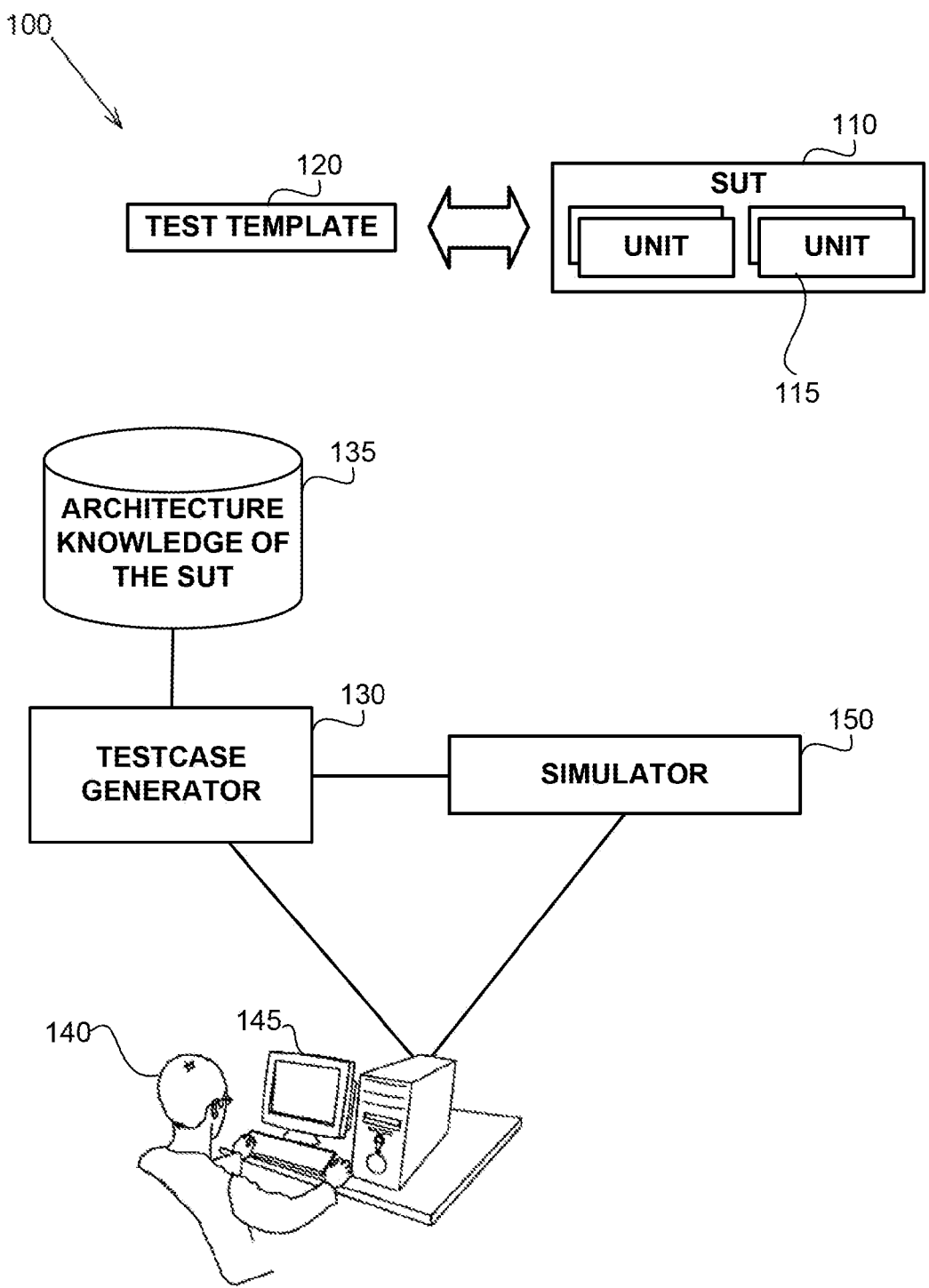
FIG. 1 shows a computerized environment in which the disclosed subject matter is used, in accordance with some exemplary embodiments of the subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to generate a system-level testcase based on a template. Another technical problem is to generate a testcase to a system comprising of a plurality of units. Yet another technical problem is to generate a quality testcase in which operation of the units is coordinated from a system-level perspective. Yet another technical problem is to generate testcases comprising stimuli for units having a relatively complex interface.

One technical solution is to divide generation tasks into system-level and unit-level generation tasks. System-level generation tasks may be performed by a system-level generator. Unit-level generation tasks may be performed by a unit-level generator. Another technical solution is to determine which generation task defined by the test template is unit-level and which is system-level. The determination may be performed based on architecture knowledge of the SUT. The determination may be performed based on indications in the test template, such as provided manually by an author of the test template or by an automatic preprocessing tool. Yet another technical solution is to utilize a system-level generator to generate an abstract testcase, and utilize a unit-level generator to generate a testcase based on the abstract testcase. The system-level generator may provide instructions to the unit-level generator as to how to perform the unit-level generation tasks. Yet another technical solution is to utilize a plurality of unit-level generators, each associated with a different unit. The unit-level generators may be predetermined or obtained dynamically. The unit-level generators may be special-purpose generator designed for a specific generation task (e.g., a generator developed ad-hoc, a dedicated program, or the like). The system-level generator may be a general-purpose generator, such as a CSP-based generator.

One technical effect of utilizing the disclosed subject matter is to divide the task of generating a system-level testcase into tasks that may take into account the SUT as a whole (i.e., system-level generation tasks) and into low-level tasks that are generally indifferent of the system as a whole (i.e., unit-level generation tasks). The above characterization of system-level and unit-level generation tasks is provided as an exemplary only. It will be specifically noted that in some exemplary embodiments some system-level generation tasks may not take into account the SUT as a whole. It will be specifically noted that in some exemplary embodiments some unit-level generation tasks may not be indifferent of the system as a whole. Another technical effect is to enable reuse of unit-level generators for system-level testcase generation. Yet another technical effect is to enable modular approach to system-level testcase generation in which different generation techniques are utilized to generate different portions of the testcase. For example, system-level tasks may be performed using a first approach, unit-level tasks associated with a first unit may be performed using a second approach and unit-level tasks associated with a second unit may be performed using a third approach.

Referring now to FIG. 1 showing a computerized environment in which the disclosed subject matter is used, in accordance with some exemplary embodiments of the subject matter.

A computerized environment 100 may comprise a SUT 110. The SUT may be a hardware component, a hardware system, a software module, a firmware module, a computerized device, a combination thereof or the like. In some exemplary embodiments, the SUT may be a system comprising one or more units 115. A "unit" is a computerized module that is relatively independent. For example, in a SUT of a chip there may be several units such as a general-purpose processor, a special-purpose processor, a hardware accelerator, a bus, a memory controller, a bridge to connect I/O devices or the like. In some exemplary embodiments, a processor may comprise a core as a unit; a core may comprise a hardware thread as a unit, or the like. In some exemplary embodiments, there may be several units of the same type (e.g., several cores). There may be several units of different types (e.g., a hardware accelerator and a network packets processing units).

In some exemplary embodiments, one or more of the units 115 may be characterized in requiring input of predetermined format that is relatively complex. For example, a cryptographic hardware accelerator may be characterized in having an input that should obey complex cryptographic rules. As another example, a unit may require complex address translation. The translation path in such an example may include several levels of different translation tables that need to be accounted for during generation of a testcase. As yet another example, in a network packet processing unit, the packet may have a complex multi-layer structure (e.g., Ethernet TCP packet). Therefore, a generated testcase may be required to provide a valid network packet according to the complex structure. It will be noted that the examples herein are provided for the ease of explanation only. The disclosed subject matter is not limited to these examples or to such units. A person of ordinary skill in the art would be able to recognize additional units that may be considered appropriate to be handled based on the teachings of the disclosed subject matter. Generally speaking, and as an example only, it may be efficient to apply the disclosed subject matter in cases where a unit may be deemed as associated with a relatively complex CSP.

In some exemplary embodiments, a test template 120 may be associated with the SUT 110 and describe, in a general manner, a testcase to be generated and used to test the SUT 110. The generated testcase may be configured to stimulate the SUT 110 and at least a portion of the units 115.

The test template 120 may be provided in a predetermined formal language. The test template 120 may be hand-written by a user 140, such as a specification engineer, a verification engineer, a QA staff member, a developer or the like.

In some exemplary embodiments, a testcase generator 130 may be configured to process the test template 120 and generate a testcase. The testcase may be in line with requirements and definitions of the test template 120. In some exemplary embodiments, the testcase generator 130 may be an offline generator. In some exemplary embodiments, the testcase generator 130 may be configured to utilize architecture knowledge of the SUT 135 such as retained in a hard disk drive, a Flash disk, a Random Access Memory (RAM), a memory chip, a remote storage server, or the like. The architecture knowledge 135 may be utilized to bias the generated testcase to be of relatively high quality, such as for example invoking predetermined events that are more "interesting" (e.g., cache events, sharing of a cache line by a plurality of processors, causing a page fault, reusing a previously utilized address space and the like). A person of ordinary skill in the art is aware of a large number of classes of such "interesting" events that are associated with a high quality testcase.

In some exemplary embodiments, a simulator 150 may be operative to simulate an execution of the SUT 110 in respect to a testcase. The testcase generated by the testcase generator 130 may be utilized by the simulator 150. In some exemplary embodiments, the simulator 150 may be a Hardware Descriptive Language (HDL) simulator. In some exemplary embodiments, a simulator 150 may operate slower than the actual SUT 110. However, the SUT 110 may not be available at a testing phase prior to fabricating a hardware chip. As the simulator 150 may operate relatively slow, it is preferable that testcases utilized in simulation be valid (e.g., stimulate a well-defined behavior of the SUT 110) and of relatively high quality. A testcase that expands coverage of testing of the SUT 110 may be considered a testcase of high quality. A testcase that stimulate a potentially erroneous behavior of the SUT 110 may be considered a testcase of high quality.

In some exemplary embodiments, the user 140 may interact with the computerized system 100 using a Man-Machine Interface (MMI) 145 such as a terminal, a display, a keyboard, an input device or the like. The user 140 may define the test template 120 such as by writing a text file containing the test template. The user 140 may define the architecture knowledge of the SUT 135. The user 140 may provide rules, commands, preferences, and parameters to the testcase generator 130. The user 140 may provide rules, commands, preferences, and parameters to the simulator 150. The user 140 may view the testcase generated by the testcase generator 130. The user 140 may view the simulated execution performed by the simulator 150 (e.g., by viewing a log file). Based upon the simulated execution by the simulator 150, the user 140 may determine to design a new test template, such as 120, to modify the test template 120, to generate additional testcases based on the original, new or modified test template 120 or the like. In some exemplary embodiments, there may be several different users, such as for example one user may define the test template 120, while another user may operate the testcase generator 130.

Figure 2:
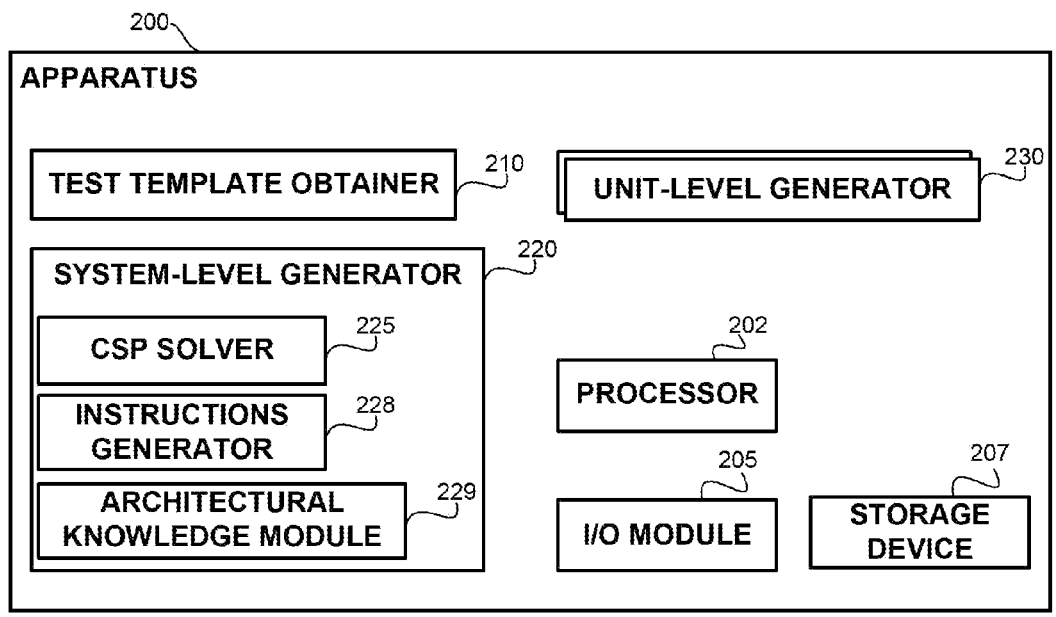
FIG. 2 shows a block diagram of an apparatus, in accordance with some exemplary embodiments of the disclosed subject matter.

Referring now to FIG. 2 showing an apparatus in accordance with some exemplary embodiments of the disclosed subject matter. An apparatus 200, such as 130 of FIG. 1, may be configured to generate at least one testcase based on a test template.

In some exemplary embodiments, a test template obtainer 210 may be configured to retrieve, receive, or otherwise obtain a test template, such as a 120 of FIG. 1. In some exemplary embodiments, the test template obtainer 210 may utilize an I/O module 205 to obtain the test template.

In some exemplary embodiments, a system-level generator 220 may be configured to generate an abstract testcase based on the test template. The system-level generator 220 may be configured to perform system-level generation tasks. The system-level generation tasks may be tasks that affect coordination of the units of the SUT. For example, a first unit may be required to read the address written to by a second unit in order to provide for a quality testcase. As another example, a timing of operation of a first unit may be affected by a timing of operation of a second unit.

In some exemplary embodiments, the abstract testcase may be a testcase that is not complete—i.e., it cannot be utilized as is by a simulator, such as 150 of FIG. 1. The abstract testcase may be a file of the form of a test template (e.g., the test template obtained may be modified to represent a smaller number of testcases), may be a file of the form of a testcase (having, optionally, partial instructions) or may be of other format.

In some exemplary embodiments, the test template may explicitly or implicitly define generation tasks. In some exemplary embodiments, some of the generation tasks may be system-level generation tasks and some may be unit-level generation tasks. In some exemplary embodiments, the test template may define a system-level generation task that, once performed, may require additional unit-level generation tasks. Such unit-level generation tasks are also said to be defined by the test template.

In some exemplary embodiments, the system-level generator 220 may utilize an architectural knowledge of the SUT, such as retained by an architectural knowledge module 229, in order to bias the generation towards a testcase of a generally high quality. The system-level generator 220 may be a general-purpose generator configurable to generate quality testcases for the specific SUT using the architectural knowledge of the SUT.

In some exemplary embodiments, the system-level generator 220 may identify which of the generation tasks defined by the test template are system-level and which are not (i.e., are deemed as unit-level). The determination may be made in accordance with architectural knowledge of the SUT, such as retained by the architectural knowledge module 229. In some exemplary embodiments, the test template may indicate which generation task is a system-level generation task and which is a unit-level generation task. The indication may be provided using a predetermined format such as a comment, a symbol, or the like. The indication may be hand-written by the author of the test template. Alternatively, the indication may be automatically generated, such as by a preprocessing module that is able to distinguish between the two types of generation tasks.

A unit-level generation task may be associated with a specific unit of the SUT. In some exemplary embodiments, the system-level generator 220 may further utilize the architectural knowledge of the SUT to determine for a unit-level generation task an associated unit out of the plurality of units of the SUT.

In some exemplary embodiments, the architectural knowledge module 229 may retain architectural knowledge provided by a user, such as 140 of FIG. 1, or otherwise inputted into the apparatus 200.

In some exemplary embodiments, a CSP solver 225 may be utilized by the system-level generator 220 as is known in the art. The system-level generator 220 may generate a CSP based on the system-level generation tasks and utilize the CSP solver 225 in order to generate the abstract testcase.

In some exemplary embodiments, an instructions generator 228 may be operative to generate instructions to an at least one unit-level generator 230. The instruction may define a unit-level generation task to be performed by the unit-level generator 230. In some exemplary embodiments, the instructions may be incorporated into the abstract testcase. In some exemplary embodiments, the instructions may be otherwise provided to the unit-level generator 230, such as using an Application Programming Interface (API), an input file or the like. In some exemplary embodiments, some instructions may be incorporated into the abstract testcase, while others may be provided in a separate manner. An instruction may indicate a target generator. In other words, the instruction may define which of the at least one unit level generator 230 should act upon the instruction.

In some exemplary embodiments, the at least one unit-level generator 230 may be configured to generate a testcase. The testcase may be a set of stimuli operative to stimulate the SUT. The testcase may comprise stimuli defined by the abstract testcase. In some exemplary embodiments, the at least one unit-level generator 230 may generate additional stimuli to be included in the testcase. The testcase, therefore, may be said to comprise the abstract testcase. In some exemplary embodiments, the testcase may be a test file comprising instructions for the SUT to perform. In some exemplary embodiments, the testcase may be a test file comprising instructions and additional stimuli provided in a different manner, such as memory initializations of the SUT, as is disclosed further below.

In some exemplary embodiments, each generator of the at least one unit-level generator 230 may perform unit-level generation tasks associated with a predetermined unit. In some exemplary embodiments, a plurality of different unit-level generators may be utilized, each associated with a different type of unit. In some exemplary embodiments, a unit-level generator may be utilized to perform unit-level generation tasks associated with a plurality of units of the same type.

In some exemplary embodiments, a unit-level generator may be configured to perform memory initialization, register initialization, or the like, for the operation of the SUT. In one exemplary embodiment, the abstract testcase may be a valid set of instructions to the SUT which does not perform proper memory initialization. The unit-level generator may provide for proper memory initialization, which may or may not be incorporated into a file comprising the set of instructions. In one exemplary embodiment, initialization instructions may be incorporated in an initialization section of the file. In another exemplary embodiment, memory initialization may be performed via another manner which may be external to the file itself. For example, memory may be initialized through a predetermined interface with the simulator 150. In such a case, the file itself may include only instructions included in the abstract testcase, however, prior to executing the file, memory initialization may be performed and therefore, in accordance with the disclosed subject matter, the testcase is viewed as if it incorporates the memory initializations and the instructions comprised by the file.

In some exemplary embodiments, the at least one unit-level generator 230 may act upon instructions provided by an instructions generator 228. In some exemplary embodiments, the unit-level generator may add into a file comprising the abstract testcase with additional stimuli. For example, a new instruction may be added, a parameter of an existing instruction may be added, or the like.

In some exemplary embodiments, the at least one unit-level generator 230 may generate expected results of executing the testcase. The expected results may be used in checking whether the SUT operates, when invoking stimuli of the testcase, in accordance with the SUT's design. In some exemplary embodiments, the expected results may be compared with simulated results to identify possible bugs in the SUT.

In some exemplary embodiments, the unit-level generator 230 may be a special-purpose generator specifically designed to perform generation tasks associated with a predetermined unit. The special-purpose generator may be manually written for the purposes of verifying the SUT. In some exemplary embodiments, the special-purpose generator may be used both in verifying the unit itself and the SUT that comprises the unit.

In some exemplary embodiments, the apparatus 200 may be configured to dynamically obtain one or more of the at least one of the unit-level generator 230 from an external source. The unit-level generator may be obtained on-the-fly. The apparatus 200 may be configured to interface with the obtained unit-level generator 230. In some exemplary embodiments, the unit-level generator 230 may be unaware that it is being used in a system-level verification as the abstract testcase appears to be a "regular" unit-level test template.

In some exemplary embodiments, the at least one unit-level generator 230 may be invoked one by one. Each may parse the abstract testcase and fill-in relevant missing parts. The relevant missing parts may be filled in accordance with the instructions generated by the instructions generator 230.

In some exemplary embodiments, the apparatus 200 may comprise a processor 202. The processor 202 may be a Central Processing Unit (CPU), a microprocessor, an electronic circuit, an Integrated Circuit (IC) or the like. The processor 202 may be utilized to perform computations required by the apparatus 200 or any of it subcomponents.

In some exemplary embodiments of the disclosed subject matter, the apparatus 200 may comprise an Input/Output (I/O) module 205. The I/O module 205 may be utilized to provide an output to and receive input from a user, such as 140 of FIG. 1.

In some exemplary embodiments, the apparatus 200 may comprise a storage device 207. The storage device 207 may be a hard disk drive, a Flash disk, a Random Access Memory (ROM), a memory chip, or the like. In some exemplary embodiments, the storage device 207 may retain program code operative to cause the processor 202 to perform acts associated with any of the subcomponents of the apparatus 200. The storage device 207 may retain a test template obtained by the test template obtainer 210. The storage device 207 may retain the generated abstract testcase, the generated testcase, the architectural knowledge of the SUT, the instructions to the unit-level generator 230, or the like.

Figure 3:
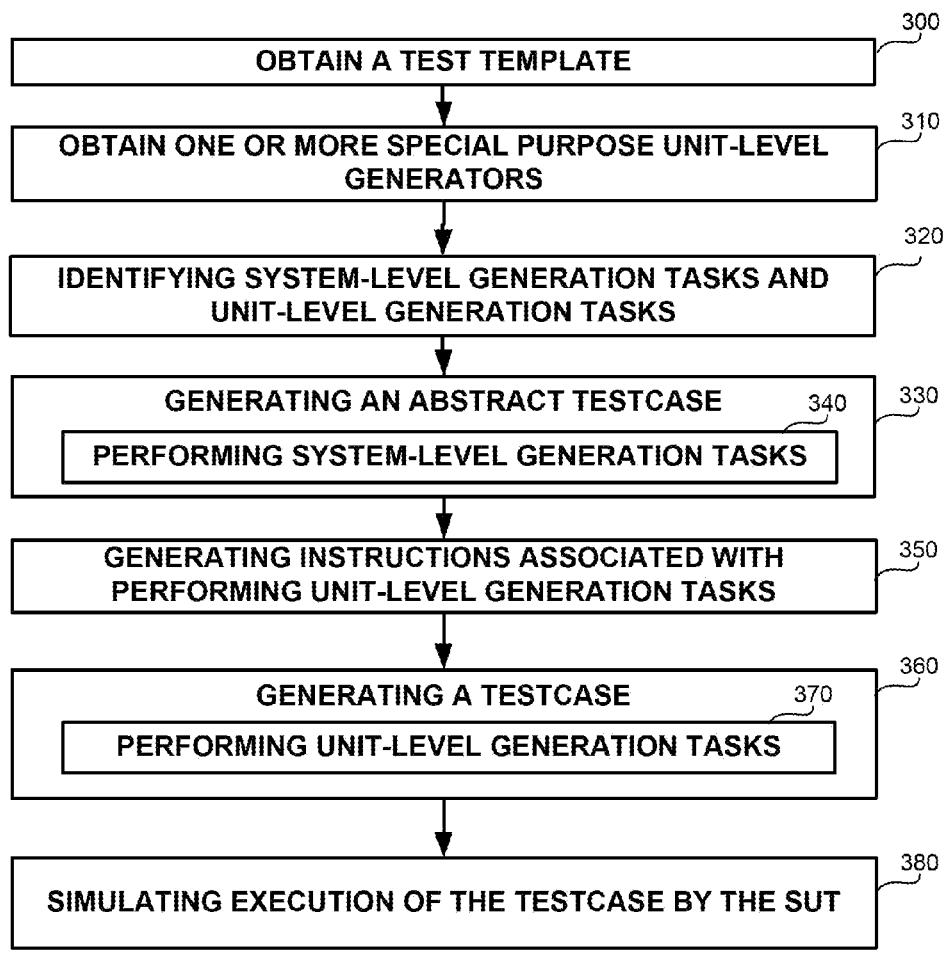
FIG. 3 shows a flowchart diagram of a method, in accordance with some exemplary embodiments of the disclosed subject matter.

Referring now to FIG. 3 showing a flowchart diagram of a method in accordance with some exemplary embodiments of the disclosed subject matter.

In step 300, a test template may be obtained. The test template may be obtained by a test template obtainer, such as 210 of FIG. 2.

In step 310, one or more special purpose unit-level generators, such as 230 of FIG. 2, may be obtained. The generators may be obtained by an I/O module such as 205 of FIG. 2. In other exemplary embodiments, the generators may be predetermined. In some exemplary embodiments, all or some of the generators may be computer programs stored in a computer readable medium.

In step 320, generation tasks defined by the test template may be distinguished into two groups: system-level and unit-level generation tasks. Identification of the system-level and unit-level generation tasks may be performed based on an architectural knowledge of the SUT, based on indications in the test template, or the like. In some exemplary embodiments, the identification may be performed by a system-level generator, such as 220 of FIG. 2.

In step 330, an abstract testcase may be generated. The abstract testcase may be generated by a system-level generator, such as 220 of FIG. 2.

In step 340, the abstract testcase may be generated by performing system-level generation tasks.

In step 350, instructions associated with performing unit-level generation tasks may be generated. The instructions may be generated by an instructions generator, such as 228 of FIG. 2. The instructions may be incorporated into the abstract testcase, may be comprised by a separate file, provided using a combination thereof or the like. An instruction may be associated with a predetermined unit-level generator, such as 230 of FIG. 2.

In step 360, a testcase may be generated. The testcase may be generated by one or more unit-level generators, such as 230 of FIG. 2.

In step 370, the testcase may be generated by performing unit-level generation tasks.

In some exemplary embodiments, in case there is a plurality of unit-level generators, they may be operated one after the other in order to generate the testcase.

In step 380, operation of the SUT while executing the testcase may be simulated using a simulator, such as 150 of FIG. 1.

In some exemplary embodiments, steps 340-360 may be performed a plurality of times in order to generate a plurality of testcases in accordance with the test template. In some exemplary embodiments, the disclosed subject matter may be utilized in respect to a variety of test templates. The generated testcases may be utilized in a simulation step 380.

It will be noted that in some exemplary embodiments a single instruction of the test template may define both a system-level generation task and a unit-level generation task. For example, consider a test template instruction of: DECRYPT IN_ADDR, OUT_ADDR, where DECRYPT is a command to operate an encryption unit, IN_ADDR is the address of the data to decrypt and OUT_ADDR is an address to which the decrypted data is written and later on processed by the SUT. In some exemplary embodiments, determining which OUT_ADDR and IN_ADDR to use may be system-level generation tasks. In some exemplary embodiments, determining a content stored within the IN_ADDR and determining expected result to be computed and stored in OUT_ADDR may be unit-level generation tasks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computerized apparatus for generating a testcase, the computerized apparatus having a processor and a storage device, the computerized apparatus comprising:
    a test template obtainer operative to obtain a test template associated with a system-under-test (SUT), wherein the SUT comprises a plurality of units, wherein the test template represents alternative testcases in which the plurality of units interact, wherein the test template defines system-level generation tasks and unit-level generation tasks;
    a system-level generator operative to generate an abstract testcase based on the test template, wherein said system-level generator is operative to perform the system-level generation tasks, wherein the abstract testcase is an incomplete testcase that cannot be executed, wherein the abstract testcase comprises the unit-level generation tasks; and
    at least one unit-level generator operative to generate a testcase comprising the abstract testcase, wherein said at least one unit-level generator is operative to perform the unit-level generation tasks.

2. The computerized apparatus of claim 1, wherein said at least one unit-level generator comprises a first unit-level generator associated with a first unit of the plurality of units and a second unit-level generator associated with a second unit of the plurality of units.

3. The computerized apparatus of claim 1, wherein a unit of the plurality of units is selected from the group consisting of: a processor, a hardware accelerator, a core of a processor, a hardware thread of a core, a bus, a memory controller, a packet processing unit, and a bridge.

4. The computerized apparatus of claim 1, wherein said system-level generator is operatively coupled to a Constraint Satisfaction Problem (CSP) solver.

5. The computerized apparatus of claim 4, wherein a unit-level generator of said at least one unit-level generator is a special-purpose generator associated with a unit of the plurality of units.

6. The computerized apparatus of claim 4, wherein said system-level generator is a general-purpose generator; and wherein said system-level generator is configured to utilize architectural knowledge of the SUT.

7. The computerized apparatus of claim 1, further comprising a simulator operative to simulate an execution of the testcase by the SUT.

8. The computerized apparatus of claim 1, wherein said system-level generator is operatively coupled to an instructions generator, wherein said instructions generator is operative to generate instructions to said at least one unit-level generator as to unit-level generation tasks.

9. The computerized apparatus of claim 8, wherein said instructions generator is operative to generate the instructions by one of the following:
    incorporating the instructions in the abstract testcase;
    providing a separate set of instructions to said at least one unit-level generator; and
    combination thereof.

10. The computerized apparatus of claim 1, wherein said system-level generator is operatively coupled to an architectural knowledge module retaining architectural knowledge of the SUT; and wherein the architectural knowledge defines which generation tasks are the system-level generation tasks and which generation tasks are the unit-level generation tasks.

11. The computerized apparatus of claim 10, wherein the architectural knowledge further defines for a unit-level generation task an associated unit out of the plurality of units.

12. The computerized apparatus of claim 1, wherein the test template indicates which generation tasks are the system-level generation tasks and which are the unit-level generation tasks.

13. The computerized apparatus of claim 1, wherein said system-level generator and said at least one unit-level generator are offline test generators.

14. The computerized apparatus of claim 1, wherein the abstract testcase is a second test template defining the unit-level generation tasks.

15. A computer-implemented method for generating a testcase, wherein the computer-implemented method is performed by a processor, the computer-implemented method comprising:
    obtaining a test template associated with a system-under-test (SUT), wherein the SUT comprises a plurality of units, wherein the test template defines system-level generation tasks and unit-level generation tasks;
    generating an abstract testcase based on the test template, wherein said generating the abstract testcase comprises performing the system-level generation tasks, wherein the abstract testcase is an incomplete testcase that cannot be executed, wherein the abstract testcase comprises the unit-level generation tasks;

generating the testcase, wherein the testcase comprises the abstract testcase, wherein said generating the testcase comprises performing the unit-level generation tasks; and outputting the testcase.

16. The computer-implemented method of claim 15, wherein said performing the unit-level generation tasks is performed by at least one unit-level generator.

17. The computer-implemented method of claim 16, wherein the at least one unit-level generator comprises a plurality of unit-level generators, each associated with a different unit of the plurality of units.

18. The computer-implemented method of claim 16, further comprising: obtaining a special-purpose generator associated with a unit; and wherein said performing the unit-level generation tasks is performed by said special-purpose generator.

19. The computer-implemented method of claim 15, wherein said performing the system-level generation tasks is performed by a system-level generator.

20. The computer-implemented method of claim 15, further comprising simulating an execution of the testcase by the SUT.

21. The computer-implemented method of claim 20, further comprising:

determining an expected result associated with execution of the testcase;

in response to said simulating, comparing the expected result with a simulated result; and outputting an indication of the comparison.

22. The computer-implemented method of claim 15, further comprising determining, based upon architectural knowledge of the SUT, which generations tasks are system-level generation tasks and which generations tasks are unit-level generation tasks.

23. The computer-implemented method of claim 15, further comprising determining, based upon indications in the test template, which generations tasks are system-level generation tasks and which generations tasks are unit-level generation tasks.

24. The computer-implemented method of claim 15, wherein said generating the abstract testcase further comprises generating instructions associated with unit-level generation tasks; and wherein said generating the testcase is performed based upon the instructions.

25. A computer program product for generating a testcase, the product comprising:

a non-transitory computer readable medium;

a first program instruction for obtaining a test template associated with a system-under-test (SUT), wherein the SUT comprises a plurality of units, wherein the test template defines system-level generation tasks and unit-level generation tasks;

a second program instruction for generating an abstract testcase based on the test template, wherein the generating the abstract testcase comprises performing the system-level generation tasks, wherein the abstract testcase is an incomplete testcase that cannot be executed, wherein the abstract testcase comprises the unit-level generation tasks;

a third program instruction for generating the testcase, wherein the testcase comprises the abstract testcase, wherein the generating the testcase comprises performing the unit-level generation tasks; and wherein said first, second and third program instructions are stored on said computer readable medium.

* * * * *